Jan. 6, 1931.     H. SCHUCHMANN     1,787,997
MEANS FOR INDICATING FREQUENCY CHANGES
Filed Oct. 20, 1927
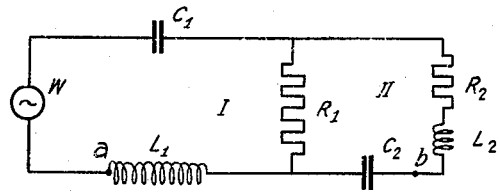
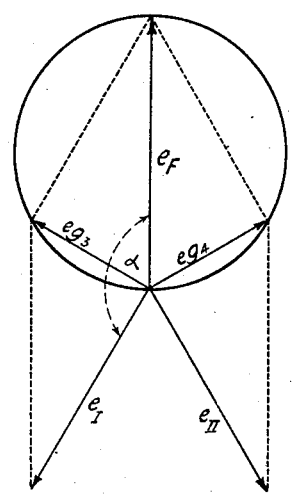
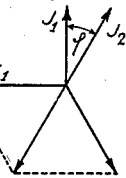
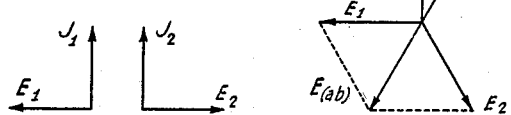
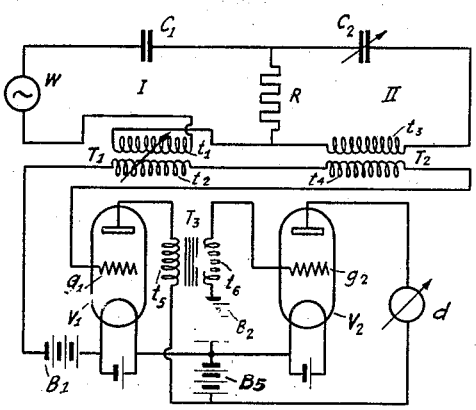
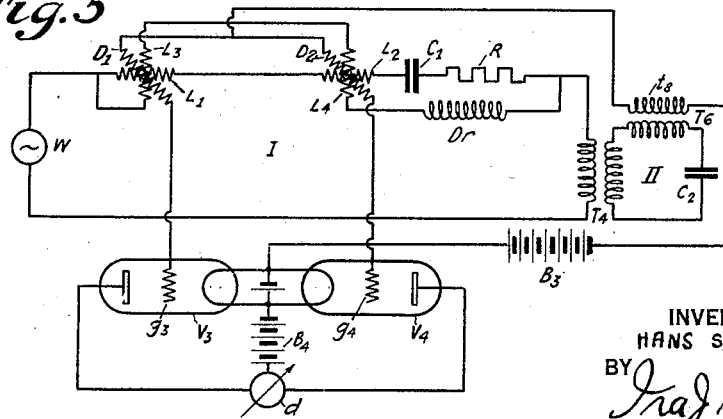
INVENTOR
HANS SCHUCHMANN
BY
ATTORNEY Patented Jan. 6, 1931

1,787,997

UNITED STATES PATENT OFFICE

HANS SCHUCHMANN, OF BERLIN-CHARLOTTENBURG, GERMANY, ASSIGNOR TO SIEMENS & HALSKE, AKTIENGESELLSCHAFT, OF SIEMENSSTADT, NEAR BERLIN, GERMANY, A CORPORATION OF GERMANY

MEANS FOR INDICATING FREQUENCY CHANGES

Application filed October 20, 1927, Serial No. 227,542, and in Germany August 4, 1926.

Application for this invention filed in Germany, August 4, 1926.

The object of the present invention is to construct a device adapted to occasion opposite mechanical or electrical effects, or, more particularly speaking, to insure an adjustment whenever the frequency of an alternating current goes beyond or falls below a certain normal value. Other objects of the invention will appear in the following specification when read in connection with the drawing in which Figure 1 illustrates diagrammatically a basic arrangement of the fundamental features of the invention;

Figures 2 and 3 illustrate diagrammatically in vector form conditions existing in the different circuits;

Figure 4 illustrates one practical circuit incorporating the invention;

Figure 5 diagrammatically shows another embodiment of the invention in which the adjustability of the phase angle is attained by rotor coils and Figure 6 diagrammatically shows the potential conditions existing in the circuit of Figure 5.

Means involving the use of electron discharge devices are known to the art utilizing the shift in phase in the case of frequency inequality between two circuits in such a way that either the alternating current potential subject to control serves as the plate potential, while the potential derived from an oscillation circuit is impressed upon the grid of an electron tube, or else both of the said potentials before referred to are supplied to the grid.

Now, in accordance with the disclosures of the present invention the phase angle of the grid potential is made adjustable at different values so that, in the presence of phase equality, or co-phasal condition, there results zero potential, while in case of phase dissimilarity, it changes uniformly in both directions from said zero value. Adjustment of the phase angle is insured by inserting, in the circuit influencing the grid of the electron tube whose potential is dependent upon the standard oscillation circuit and an alternating current potential acting thereon, an adjustable self-inductance or condenser.

In Figure 1 the alternating current potential to be controlled or checked, upon which a switch or regulating process or action may depend, is produced by the alternating current source W in the circuit I of which there is a self-inductance coil $L_1$, a condenser $C_1$ and an ohmic resistance $R_1$. Across the latter is connected the standard oscillation circuit II containing a capacity $C_2$, a self-inductance coil $L_2$ and a resistance $R_2$. Since the series connection of the condenser $C_2$ and the self-inductance coil $L_2$ constitutes a purely ohmic resistance, it will be seen that series resonance arises in the presence of resonance, and the currents flowing in circuits I and II are in phase. If the resistance coupling is properly chosen, it is possible to make conditions so that the potential at the self-inductance coil $L_1$ of circuit I, in absolute value, is equal and opposite to the potential at the condenser $C_2$ of circuit II, as can be seen from Fig. 2. The total potential between points $a$ and $b$ in a circuit diagram as shown in Fig. 1, therefore, in the presence of perfect tuning, is equal to zero, while in case of untuning $J_1$ and $J_2$, it increases very rapidly by the angle $\varphi$ in one direction or the other of the resonance point (see Fig. 3) so that there arises a potential $E_{ab}$ between points $a$ and $b$.

In Figure 4, a practical circuit scheme wherein the basic idea above described is shown. In said figure, the machine or test circuit I consists of the alternating current source W, condenser $C_1$, resistance R in which are comprised the resistances $R_1$ and $R_2$ as shown in Fig. 1, and the primary winding $t_1$ of an air-core transformer $T_1$ which, for instance, may form a filter circuit and be tuned to a tonal frequency. Coupled with the said circuit I by way of resistance R is the circuit II which may serve as the measuring standard circuit. The latter comprises a variable condenser $C_2$ and the primary winding $t_3$ of an air-core transformer $T_2$. The secondary windings $t_2$ and $t_4$ of the transformer $T_1$ and $T_2$ respectively, are connected in opposition, the resultant potential being fed to the grid $g_1$ of an amplifier tube $V_1$. This potential is further supplied by way of the transformer $T_3$ whose primary is connected in the plate circuit of the amplifier tube $V_1$ through its secondary winding $t_6$ to the grid $g_2$ of rectifier tube $V_2$. A battery $B_1$ serves to supply a grid biasing potential. The plate circuit contains a battery $B_5$, while the plate circuit of the second tube $V_2$ contains a measuring instrument $d$.

The measuring device $d$, connected in the anode circuit of the rectifier tube $V_2$, responds as soon as an alternating potential reaches the grid $g_1$ of the first tube, hence indicating thereby the fact that the frequency to be tested has deviated from the normal frequency. For the purpose of increasing the indicating sensitivity the measuring apparatus $d$ may be compensated by means of connecting in a counter voltage so that it will indicate zero in the position of normal frequency.

In the presence of frequency equality, the series combination comprising the condenser $C_2$ and the coil $t_3$ of the circuit II presents a purely ohmic resistance. The currents flowing in circuits I and II, owing to resistance coupling, are in phase, and also the potentials in the unloaded secondary windings $t_2$ and $t_4$ of transformers $T_1$ and $T_2$. The integral potential of the oppositely connected windings $t_2$ and $t_4$, if the coupling of the two circuits I and II is properly chosen, is equal to zero, and the measuring device $d$ remains unaffected. However, upon the arising of the slightest departure in the frequency to be measured, or by slight setting of the condenser $C_2$, the phase of the currents in circuits I and II undergo an alteration and so do the phase relations depending thereon of the secondary potentials in the windings $t_2$ and $t_4$ of the transformer $T_1$ and $T_2$. The integral potential differs from zero, and the measuring device $d$ shows a response.

In the case of tonal frequencies the measuring device may consist of a single amplifier tube. In the case of radial frequency, however, it is necessary to measure the current in the plate circuit and, under certain conditions, a rectifier tube acting as an amplifier may be required. As to the rest, instead of using a variable condenser, also the coil $t_1$ or coil $t_2$ may be made variable.

The energy consumption of the arrangement is very small, and the responsiveness or sensitivity very high, since on account of the connection in opposition, the two secondary potentials may be chosen very great so that the difference assumes considerable values even in the presence of the slightest alterations in the phase angle. By variation and re-adjustment of the condenser $C_2$, not only exact adjustment, but also an absolute measurement of speed and the like is possible by noting the time it takes the current in one branch to attain the same conditions as those of the other.

An embodiment of the invention in which the phase angle of a part of the potentials, tapped for the influencing of the measuring device, is adjustable in a particularly convenient manner, is shown by the circuit arrangement according to Figure 5. The illustration shows at the same time a symmetrical arrangement which renders the indications of the measuring apparatus to a great extent independent of the operating characteristics of the amplifiers or the rectifying tubes. While the circuit arrangement according to Figure 4 merely insures the control and, with an exact calibration of the condenser $C_2$, also the absolute measurement of the frequency and, besides, shows only the deviation from the normal frequency, the arrangement according to Figure 5 insures also the indication of the direction of the deviation of the frequency upwards or downwards with the result that the simple measuring apparatus may be replaced, when using this circuit arrangement, by a relay for the readjustment to the correct frequency.

In the circuit I are disposed the alternating current source W, the coils $L_1$ and $L_2$ of the rotating field variometers, a condenser $C_1$ connected in series with an ohmic resistance R, as well as the winding of a transformer $T_4$ which insures the coupling with the normal oscillating circuit II. There may, of course, be used in place of the transformer $T_4$ also a resistance coupling according to Figures 1 or 4. In shunt with the coils $L_1$ and $L_2$ and the series connections of $C_1$ and R are further disposed coils of the rotating field variometers $L_3$ and $L_4$ as well as a choke coil $D_r$. The resistance values of the variometer coils, also of the condenser $C_1$, the ohmic resistance R and the choke $D_r$ are selected in the manner that the currents which flow, on the one hand, through the coils $L_1$ and $L_2$ and, on the other hand, through $L_3$ and $L_4$ are shifted in their phase by about 90°. By means of the cross-like arrangement of the coils of the rotating field variometer there are produced two opposing rotating fields of, as nearly as possible, equal amplitude. In the rotating fields are adjustably arranged further coils $D_1$ and $D_2$ which are suitably mounted on a common axis. The two variometer coils $D_1$ and $D_2$ are suitably connected, on the one hand, with the grids $g_3$ and $g_4$ of the rectifying or amplifying tubes $V_3$ and $V_4$ and, on the other, are joined together to the winding $t_8$ of a transformer $T_6$ which is disposed in the normal oscillating circuit II. The voltage of the open circuit for the grids $g_3$ and $g_4$ of the above mentioned tubes is supplied by battery $B_3$ which is connected, on the one hand, with the cathodes of the tubes and, on the other hand, with the transformer winding $t_8$. In the plate circuit of the opposing tubes $V_3$ and $V_4$ is disposed the plate battery $B_4$ and a differential apparatus or differential relay $d$.

The voltage conditions follow from the vector diagram according to Figure 6 $e_F$ is the potential taken from the normal oscillating circuit II which is tapped at the transformer winding $t_8$ and which is always common to the two grid potentials. To this potential are vectorially added the potentials $e_I$ or $e_{II}$, which are furnished by the rotors $D_1$ and $D_2$, respectively. In the normal state these two potentials must be of exact equal length and must be disposed symmetrically to the common potential $e_F$. They are, besides, in their absolute length approximately equal to this common potential $e_F$ and shifted with respect to the latter by the phase angle $\alpha$. The angle $\alpha$ is chosen as large as possible, however, it must not reach 180°. A suitable value would be around 170°. This phase angle may be adjusted at will by means of the rotation of the rotors $D_1$ and $D_2$ which are coupled with one another but which are also individually adjustable. With a correct balancing of the elements of the circuit arrangement and of the operating voltages of the tubes the grid potentials $e_{g3}$ and $e_{g4}$ are of equal value in the normal state with the result that the indicating device $d$, disposed in the plate circuit, shows zero. With the slightest deviation of the frequency to be tested from the normal frequency the phase of the current in the normal oscillating circuit II changes, hence, the vector $e_F$ rotates, its end point moving thereby approximately in a circle. When, for instance, the vector $e_F$ in Figure 6 turns to the left, the grid potential $e_{g3}$ increases and the grid potential $e_{g4}$ decreases. In this condition the change of the potentials $e_I$ and $e_{II}$ is negligible in its size with respect to the change of $e_F$, with the result that for the change of the grid potentials the change of the potentials $e_F$ is essentially the influencing factor. This change is also in this arrangement again quite considerable due to the almost straight position of the two part potentials $e_F$ and $e_I$ or $e_F$ and $e_{II}$, so that the entire arrangement responds with great reliability to even extremely small dissonances.

The rotating field variometers represented in Figure 5 are the means for insuring a particularly convenient and exact adjustment of the part potentials to be tapped, it is, however, directly possible to tap the component potentials in different manner from the circuit to be tested or the standard circuit, for instance by means of transformers according to Figure 4. What has to be done in this case is simply to take care that each two component potentials, which are combined to a resulting grid potential, have a phase shift of not quite 180°, for instance about 170°, with respect to one another and that they are of about equal absolute length.

Having thus described my invention what I desire to protect by Letters Patent is as follows:

1. A device for indicating changes in the frequency of a generator which comprises a generator circuit having an inductance and a capacity therein, an oscillation circuit coupled thereto and an electron tube circuit arrangement having an input circuit and an output circuit means comprising said generator circuit and said oscillation circuit for supplying energy to said input circuit and means in said output circuit affected by changes in the supplied input energy.

2. In a device for indicating changes in the frequency of a generator, a generator circuit comprising a capacity and an inductance, an oscillation circuit coupled to said generator circuit and having tuning means therein, an electron tube circuit arrangement having output and input circuits current responsive means in said output circuit, means for coupling each of said first two mentioned circuits to said input circuit whereby upon any changes occurring in the frequency of energy in either of said first two mentioned circuits the energy in the output circuit of said electron tube circuit arrangement will be affected and means controlled thereby for effecting said current responsive means.

3. In a device for indicating changes in the frequency of an oscillating circuit, a standard oscillation circuit coupled thereto, differential phase responsive means coupled to each of said circuits and means controlled thereby for detecting any changes occurring in said oscillation circuits.

4. In a system for indicating frequency changes, an oscillation source, a circuit comprising a reactance, a resistance and coupling means in series with said source, a standard oscillation circuit coupled to said first named circuit, an electron discharge tube circuit arrangement having input and output circuits said input circuit being coupled by means of said coupling means to said first mentioned circuit, means for also coupling said input circuit with said standard oscillation circuit and an indicating device connected in said output circuit.

5. In a device for indicating changes in the frequency of electrical oscillations, a pair of rotating field variometers each thereof having two fixed windings and a movable winding, said windings being arranged so that the rotating field in one of said variometers is opposed to the rotating field of the other, a closed circuit including a source of electrical oscillations, one corresponding fixed winding for each of said variometers, a capacity and a resistance all in series with a coupling coil, a circuit comprising the other of said fixed windings of each of said variometers and a reactance shunted across said first two windings said capacity and said resistance, a pair of triode circuits the control electrode of one thereof being connected to one end of one of said movable windings and the control electrode of the other triode being connected to one end of said other movable winding, means for connecting the free ends of said movable windings and means comprising a second coupling coil and a current source for connecting said last named means to the filaments of each of said triodes, a tuned oscillatory circuit including a capacity and two coils all in series one of said coils being coupled to said first mentioned coupling coil, the other thereof being coupled to said second coupling coil and means including a current responsive device for connecting the output circuits of said triodes in opposition.

HANS SCHUCHMANN.